US010140266B2

(12) United States Patent
Falk et al.

(10) Patent No.: US 10,140,266 B2
(45) Date of Patent: Nov. 27, 2018

(54) PROFILE-BASED OPTIMIZATION OF XSLT TRANSFORMATIONS

(71) Applicant: Altova GmbH, Vienna (AT)

(72) Inventors: Alexander Falk, Marblehead, MA (US); Vladislav Gavrielov, Vienna (AT)

(73) Assignee: Altova GmbH, Vienna (AT)

( * ) Notice: Subject to any disclaimer, the term of this patent is extended or adjusted under 35 U.S.C. 154(b) by 874 days.

(21) Appl. No.: 14/145,076

(22) Filed: Dec. 31, 2013

(65) Prior Publication Data

US 2015/0186339 A1 Jul. 2, 2015

(51) Int. Cl.
*G06F 17/00* (2006.01)
*G06F 17/22* (2006.01)
(52) U.S. Cl.
CPC .................................. *G06F 17/227* (2013.01)
(58) Field of Classification Search
CPC .................................................... G06F 17/227
See application file for complete search history.

(56) References Cited

U.S. PATENT DOCUMENTS

| | | | | |
|---|---|---|---|---|
| 8,032,525 | B2* | 10/2011 | Bowers | G06F 17/30407 707/717 |
| 2001/0056504 | A1* | 12/2001 | Kuznetsov | G06F 8/30 719/310 |
| 2005/0273772 | A1* | 12/2005 | Matsakis | G06F 8/41 717/136 |
| 2006/0242563 | A1* | 10/2006 | Liu | G06F 17/227 715/234 |
| 2007/0245330 | A1* | 10/2007 | Lapounov | G06F 17/2247 717/157 |

\* cited by examiner

*Primary Examiner* — Stephen S Hong
*Assistant Examiner* — Marshon L Robinson
(74) *Attorney, Agent, or Firm* — Adler Pollock & Sheehan P.C.; Kenneth F. Kozik, Esq.

(57) ABSTRACT

Methods and apparatus, including computer program products, for profile-based optimizations of Extensible Stylesheet Language Transformations (XSLT) transformations. A method includes generating a XSL (Extensible Stylesheet Language) Transformations (XSLT) and Extensible Markup Language (XML) Path Language (XPath) execution tree for an XSLT stylesheet, determining one or more optimizations for the XSLT and XPath execution tree, applying the one or more optimizations to the XSLT and XPath execution tree, verifying the one or more optimizations in the XSLT and XPath execution tree, making the verified one or more optimizations persistent in an optimized XSLT stylesheet, and transforming one or more source XML documents into one or more result documents using the optimized XSLT stylesheet.

10 Claims, 2 Drawing Sheets

100

Generate a XSL (EXtensible Stylesheet Language) Transformations (XSLT) and Extensible Markup Language (XML) Path Language (Xpath) execution tree for an XSLT stylesheet
110

Determine one or more optimizations for the XSLT and XPath execution tree
120

Apply the one or more optimizations to the XSLT and XPath execution tree
130

Verify the one or more optimizations in the XSLT and XPath execution tree
140

Make persistent the verified one or more optimizations in an optimized XSLT stylesheet
150

Transform one or more source XML documents into one or more result documents using the optimized XSLT stylesheet
160

FIG. 1

PROFILE-BASED OPTIMIZATION OF XSLT TRANSFORMATIONS

BACKGROUND OF THE INVENTION

The invention generally relates computer systems and computer executed methods, and more specifically to profile-based optimizations of Extensible Stylesheet Language Transformations (XSLT) transformations.

In general, XSLT is a language for transforming XML documents into XHTML documents (or any other text file or document) and XPath is a language for navigating in XML documents. XSLT is used to transform an XML document into another XML document, or another type of document that is recognized by a browser, like HTML and XHTML. Normally, XSLT does this by transforming each XML element into an (X)HTML element. XSLT uses XPath to find information in an XML document. XPath is used to navigate through elements and attributes in XML documents. In a transformation process, XSLT uses XPath to define parts of the source document that should match one or more predefined templates. When a match is found, XSLT will transform the matching part of the source document into the result document.

With input data sets growing faster than computing resources, there is a large demand to improve the runtime performance of these transformations by XSLT code optimizations. However, up until now, a developer had to look at a profiling report manually and figure out ways to potentially rewrite the XSLT instructions or the XPath expressions used therein to speed up the execution.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for profile-based optimizations of Extensible Stylesheet Language Transformations (XSLT) transformations.

More specifically, the present invention describes a method and system in which an XSLT processing engine profiles the execution of an XSLT transformation to get a baseline timing, analyzes an execution tree to identify "hotspot" instructions that can benefit from optimizations, identifies one or more patterns for optimizations, and then applies those proposed optimizations to the execution tree. The system and method of the present invention then re-runs the profiling run to verify whether these optimizations actually result in increases of execution speed and only selects those that have a positive impact. The selected optimizations are then made persistent by embedding processing instructions into the XSLT stylesheet that a production XML/XSLT processing engine can later use to implement the optimizations.

In general, in one aspect, the invention features a method including generating a XSL (Extensible Stylesheet Language) Transformations (XSLT) and Extensible Markup Language (XML) Path Language (XPath) execution tree for an XSLT stylesheet, determining one or more optimizations for the XSLT and XPath execution tree, applying the one or more optimizations to the XSLT and XPath execution tree, verifying the one or more optimizations in the XSLT and XPath execution tree, making the verified one or more optimizations persistent in an optimized XSLT stylesheet, and transforming one or more source XML documents into one or more result documents using the optimized XSLT stylesheet.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 1 is an exemplary flow diagram of a profile-based optimization of XSLT transformations method.

DETAILED DESCRIPTION

Figure 2:
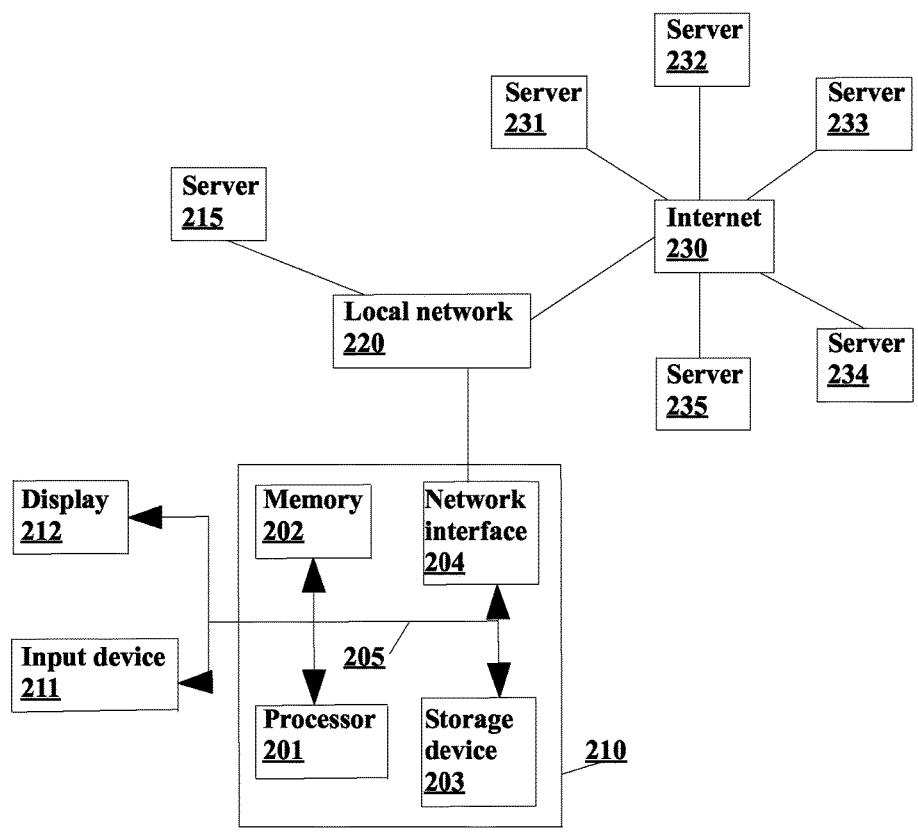
FIG. 2 is an example computer system and network for implementing embodiments of the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary profile-based optimization of XSLT transformations process 100 includes generating (110) a XSL (Extensible Stylesheet Language) Transformations (XSLT) and Extensible Markup Language (XML) Path Language (XPath) execution tree for an XSLT stylesheet. Generating (110) includes an XSLT transformation initialization process where for the corresponding XSLT execution tree nodes are created corresponding to the stylesheet. XPaths are validated, static analysis is performed, and so forth.

Process 100 determines (120) one or more optimizations for the XSLT and XPath execution tree. The optimization is usually a time-space trade-off, i.e., often using more memory can help computing the result faster, but exceeding a certain memory limit can cause significant slowdown. Because of the input data driven nature of the XSLT transformation (execution path is decided at run time) the parts that should be optimized can't be chosen by looking at the XSLT code only.

Determining (120) the one or more optimizations for the XSLT and XPath execution tree can include profiling with sample data, identifying one or more hot-spot execution instruction nodes, and identifying one or more patterns for optimization for the one or more identified hot-spot execution instruction nodes.

Profiling with sample data includes transforming data in a non-empty set of input files with data considered representative of actual data with hit-count profiling enabled in multiple passes (to determine how long the summary execution time is), and summarizing the profile data of each of the multiple passes. More specifically, to identify the hot spot/bottleneck instruction(s), a non-empty set of input files with data considered representative (structure and statistical distribution of nodes) for the production data is transformed with hit-count profiling enabled. The profile data of multiple runs is summarized and filtered.

Identifying one or more hot-spot execution instruction nodes includes, for each instruction in the execution tree, analyzing time and count values compared to threshold values, and selecting instructions for further analysis if predetermined conditions are fulfilled.

Identifying one or more patterns for optimization for the one or more identified hot-spot execution instruction nodes includes searching for specific patterns for which an optimization can be implemented.

XSLT and XPath, especially version 2.0 and higher, are very powerful programming languages and as with other programming languages often there are multiple solutions for the same problem. Often the execution complexity of the chosen solution is not directly visible to the XSLT stylesheet creator. Certain XSLT instructions and XPath statements are known to be more convenient to be written with a syntax, which adds unnecessary execution complexity. Other subexpressions may get reevaluated with the same context—storing the result for the specific context; identifying efficiently that it was called with the same context and retrieving can improve execution speed significantly.

In the decision process of what to optimize, the execution tree is searched for specific patterns for which an optimization can be implemented. If there is a match with a pattern, then the suggested optimization is recorded for that instruction. For matching, heuristic search on the execution tree structure and static type information is used. In one example, XPath expressions are identified with a parser generated from more restrictive XPath subset grammars. In other examples, XPath expressions are identified from full XPath grammars.

A list of exemplary optimizations is as follows.

The xpath expression "//myPrefix:myNodeName" (where nothing precedes the "//") according to the specification has to be expanded as "(fn:root(self::node( )) treat as document-node( ))/descendant-or-self::node( ))child::myPrefix:myNodeName" but can be rewritten as /descendant::myPrefix:myNodeName. Search for the nodes "myPrefix:myNodeName" directly and saving the result for successive calls may be worth it if the expression is executed several times.

The expression Node1//nodeX[@someAttribute treat as xs:string=$filterValue treat as xs:string] can be optimized using the <xsl:key name="gen_key_1" match="Node1//nodeX" use="@someAttribute"/>instruction and the expression fn:key("gen_key_1",$filterValue,.).

The xpath expression "level1/level2//level3[complex-check-based-on-current-node( )]/level4" if only a small number of level3 nodes have level4 nodes, then searching for all the level4 nodes and then filtering out the ones that have a matching parent hierarchy for "level1/level2//level3[complex-check-based-on-current-node( )]" will be faster.

Nested xsl:for-each expressions with simple xpaths can under certain conditions be executed in a single loop.

Process 100 applies (130) the one or more optimizations to the XSLT and XPath execution tree. Applying (130) the one or more optimizations to the XSLT and XPath execution tree includes replacing the one or more identified hot-spot execution instruction nodes with the corresponding identified optimization pattern.

More specifically, each execution node identified as hot-spot and matching a possible optimization pattern is replaced in the execution tree with the selected optimization pattern applied for the current node (i.e., node names, variable names, namespace nodes adapted, and so forth). If required, helper nodes are also inserted to the global part of the execution tree.

Process 100 verifies (140) the one or more optimizations in the XSLT and XPath execution tree.

Verifying (140) the one or more optimizations in the XSLT and XPath execution tree includes loading a sample XML document, transforming the sample XML document using the XSLT stylesheet with hit-count profiling enabled to produce a first profile, transforming the sample XML document using the optimized XSLT stylesheet with hit-count profiling enabled to produce a second profile, identifying one or more execution gains by comparing the first profile to the second profile, each of the one or more execution gains calculated from a time difference, and selecting optimization patterns in which an execution gain exceeds a threshold.

Process 100 makes persistent (150) the verified one or more optimizations in an optimized XSLT stylesheet. Making (150) the verified one or more optimizations persistent includes saving the selected optimization patterns in the XSLT stylesheet in an XML processing instruction used for identification of profile-based optimization data. It should be noted that in a preferred implementation the optimized XSLT stylesheet is not a modified XSLT stylesheet with new XSLT instructions. Rather, process 100 saves internal information without touching XSLT text. More specifically, process 100 uses internal functionality not available in XSLT/XPath. Thus, process 100 is not limited to XSLT/XPath commands when optimizing user statements. One advantage of not altering user's XSLT statements enables a developer to use easy to write and understand statements and still have the best performance. However, in other implementations, process 100 may rewrite some of the statements within XSLT.

More specifically, the selected optimizations are saved in the file containing the principle XSLT stylesheet in an XML processing instruction. The target NCName of the processing instruction is used for easy identification of profile based optimization data. To fulfill the XML requirements of XML processing instruction content, the optimization data's serialized content is converted to xs:hexBinary or xs:base64Binary. The principle XSLT stylesheet contains all the information on directly or indirectly imported or included XSLT stylesheets. The optimization data contains at least the following:

The optimizer version information
The optimizations:
  Location in the execution tree
  The selected optimization kind and additional info if required
  The gain achieved by the optimization
For all XSLT stylesheets (main, directly and indirectly imported/included), a hash value is calculated from the nodes and values that are significant for XSLT processing to identify modifications to the files that were done after the optimization data was saved. Significant data includes:
  Element: local name, namespace URI, attribute list, element( )|text( ) children(including their relative position)
  Attribute nodes: Local name, namespace URI; normalized value
  Element position in parents element( )|text( )
  Text node content and its position in parents element( )|text( )

An XSLT processor capable of decoding and applying the optimizations saved in the processing instruction and with optimizations enabled searches the XML document containing the main XSLT stylesheet for the processing instruction with the corresponding target and load and decode the optimization data from the processing-instruction's content. The XSLT processor recalculates the hash value for documents in the import/include tree. If there were no modifications, then the optimizations are applied to the execution tree before the XSLT transformation is executed.

Process 100 transforms (160) one or more source XML documents into one or more result documents using the optimized XSLT stylesheet.

In the process 100, there may be a special mode (menu entry, command line option, and so forth) where an XSLT transformation is executed with a non-empty set of input data—considered to be representative for production data—and after a certain number of profile/optimization runs the optimization data containing the set of selected optimization (plus additional info) is saved as a processing instruction at the end of the document containing the main XSLT stylesheet. For example, an XML editor such as XMLSpy® from Altova GMBH of Wien, Austria, includes the ability to generate the optimization data when editing XSLT stylesheets.

Governed by an option, the XSLT file is searched for the processing instruction with the specific target name then the optimization data is initialized from it and if there were no significant modifications in the involved stylesheets the optimizations are applied before the XSLT transformation is executed. In this mode, no changes to the stylesheet/optimization data are made.

For example, an XML and XSLT processing engine, such as RaptorXML® from Altova GMBH, utilizes these optimizations in a server environment to greatly speed up XSLT transformation times. Altova RaptorXML® Server is a cross-platform engine that supports XSLT 1.0 and 2.0, most of XPath 3.0, and some features from the XSLT 3.0 working draft and XQuery. It enables command line operations and interfaces to COM, Java, and .NET and also includes a built-in HTTP server.

FIG. 2 illustrates an example computer system coupled to a network that may be used to implement the present invention. Computer system 210 includes a bus 205 or other communication mechanism for communicating information, and a processor 201 coupled with bus 205 for processing information. Computer system 210 also includes a memory 202 coupled to bus 205 for storing information and instructions to be executed by processor 201, including information and instructions for performing the techniques described above, including XML schemas, translation specifications, and translation processor instructions, for example. The memory 202 includes an XML and XSLT processing engine (not shown). This memory 202 may also be used for storing temporary variables or other intermediate information during execution of instructions to be executed by processor 201. Possible implementations of this memory may be, but are not limited to, random access memory (RAM), read only memory (ROM), or both. A storage device 203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 203 may include source code, binary code, or software files for performing the techniques or embodying the constructs above, for example.

Computer system 210 may be coupled via bus 205 to a display 212, such as a cathode ray tube (CRT) or liquid crystal display (LCD), for displaying information to a computer user. An input device 211 such as a keyboard and/or mouse is coupled to bus 205 for communicating information and command selections from the user to processor 201. The combination of these components allows the user to communicate with the system. In some systems, bus 205 may be divided into multiple specialized buses.

Computer system 210 also includes a network interface 204 coupled with bus 205. Network interface 204 may provide two-way data communication between computer system 210 and the local network 220. The network interface 204 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 204 sends and receives electrical, electromagnetic, or optical signals that carry digital data streams representing various types of information.

Computer system 210 can send and receive information, including messages or other interface actions, through the network interface 204 to an Intranet or the Internet 230. In the Internet example, software components or services may reside on multiple different computer systems 210 or servers 231-235 across the network. Translation processors described above may be implemented on one or more servers, for example. A server 231 may transmit actions or messages from one component, through Internet 230, local network 220, and network interface 204 to a component on computer system 210. Translation processing may be implemented on any computer system and receive schemas and/or schema translation specifications across a network, for example. In one embodiment, translation processing may be implemented as a software service by one or more servers 231-235, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
in a computer system comprising at least a processor and a memory, generating a XSL (Extensible Stylesheet Language) Transformations (XSLT) and Extensible Markup Language (XML) Path Language (XPath) execution tree for a source XSLT stylesheet;
determining one or more optimizations for the XSLT and XPath execution tree, the determining one or more optimizations for the XSLT and XPath execution tree comprising profiling with sample data, identifying one or more hot-spot execution instruction nodes, and identifying one or more patterns for optimization for the one or more identified hot-spot execution instruction nodes, the identifying one or more hot-spot execution instruction nodes comprising, for each instruction in the execution tree, analyzing time and count values compared to threshold values, and selecting instructions for further analysis if predetermined conditions are fulfilled;
applying the one or more optimizations to the XSLT and XPath execution tree;
verifying the one or more optimizations in the XSLT and XPath execution tree;

making the verified one or more optimizations persistent in an optimized source XSLT stylesheet; and transforming one or more source XML documents into one or more result documents using the optimized source XSLT stylesheet.

2. A method of claim 1 wherein profiling with sample data comprises:

transforming data a non-empty set of input files with data considered representative of actual data with hit-count profiling enabled in multiple passes; and summarizing the profile data of each of the multiple passes.

3. A method of claim 1 wherein identifying one or more patterns for optimization for the one or more identified hot-spot execution instruction nodes comprises searching for specific patterns for which an optimization can be implemented.

4. A method of claim 1 wherein verifying the one or more optimizations in the XSLT and XPath execution tree comprises:

loading a sample XML document;

transforming the sample XML document using the XSLT stylesheet with hit-count profiling enabled to produce a first profile;

transforming the sample XML document using the optimized XSLT stylesheet with hit-count profiling enabled to produce a second profile;

identifying one or more execution gains by comparing the first profile to the second profile, each of the one or more execution gains calculated from a time difference; and selecting optimization patterns in which an execution gain exceeds a threshold.

5. A method of claim 4 wherein making the verified one or more optimizations persistent comprises saving the selected optimization patterns in the XSLT stylesheet in an XML processing instruction used for identification of profile-based optimization data or rewriting selected XSLT statements.

6. A program storage device readable by machine, tangibly embodying a program of instructions executable by the machine to perform a method comprising:

generating a XSL (Extensible Stylesheet Language) Transformations (XSLT) and Extensible Markup Language (XML) Path Language (XPath) execution tree for a source XSLT stylesheet;

determining one or more optimizations for the XSLT and)(Path execution tree, the determining one or more optimizations for the XSLT and)(Path execution tree comprising profiling with sample data, identifying one or more hot-spot execution instruction nodes, and identifying one or more patterns for optimization for the one or more identified hot-spot execution instruction nodes, the identifying one or more hot-spot execution instruction nodes comprising, for each instruction in the execution tree, analyzing time and count values compared to threshold values, and selecting instructions for further analysis if predetermined conditions are fulfilled;

applying the one or more optimizations to the XSLT and)(Path execution tree;

verifying the one or more optimizations in the XSLT and)(Path execution tree;

making the verified one or more optimizations persistent in an optimized source XSLT stylesheet; and transforming one or more source XML, documents into one or more result documents using the optimized source XSLT stylesheet.

7. A program storage device of claim 6 wherein profiling with sample data comprises transforming data a non-empty set of input files with data considered representative of actual data with hit-count profiling enabled in multiple passes; and summarizing the profile data of each of the multiple passes.

8. A program storage device of claim 7 wherein identifying one or more patterns for optimization for the one or more identified hot-spot execution instruction nodes comprises searching for specific patterns for which an optimization can be implemented.

9. A program storage device of claim 6 wherein verifying the one or more optimizations in the XSLT and XPath execution tree comprises:

loading a sample XML, document;

transforming the sample XML document using the XSLT stylesheet with hit-count profiling enabled to produce a first profile; transforming the sample XML document using the optimized XSLT stylesheet with hit-count profiling enabled to produce a second profile;

identifying one or more execution gains by comparing the first profile to the second profile, each of the one or more execution gains calculated from a time difference; and selecting optimization patterns in which an execution gain exceeds a threshold.

10. A program storage device of claim 9 wherein making the verified one or more optimizations persistent comprises saving the selected optimization patterns in the XSLT stylesheet in an XML processing instruction used for identification of profile-based optimization data or rewriting selected XSLT statements.

* * * * *